US005508882A

United States Patent [19]

Lee

[11] Patent Number: 5,508,882
[45] Date of Patent: Apr. 16, 1996

[54] BALLAST CASE FOR ELECTRONIC FLUORESCENT LAMP

[75] Inventor: Hyung J. Lee, Seoul, Rep. of Korea

[73] Assignee: Toe il Media Co., Ltd., Seoul, Rep. of Korea

[21] Appl. No.: 308,331

[22] Filed: Sep. 19, 1994

[51] Int. Cl.$^{6}$ ....... H02B 1/18

[52] U.S. Cl. ....... 361/674; 174/52.2; 174/DIG. 2; 336/65

[58] Field of Search ....... 174/52.2, DIG. 2; 336/65; 361/674

[56] References Cited

U.S. PATENT DOCUMENTS 3,851,225 11/1974 Luchetta ....... 174/DIG. 2
5,006,764 4/1991 Swanson et al. ....... 361/674

*Primary Examiner*—Gregory D. Thompson
*Attorney, Agent, or Firm*—Spencer & Frank

[57] ABSTRACT

A ballast case for electronic fluorescent lamp. The ballast case makes good a deficiency of potting compound even when deficient amount of potting compound is charged in the ballast enclosure, thus to facilitate the potting compound charging work and to effectively prevent generation of noise caused by overvoltage of ballast, and to effectively protect the ballast and varieties of parts. The ballast case comprises a rectangular box type ballast enclosure charged with potting compound and having the ballast and the varieties of parts therein, and a rectangular plate type cover covering the ballast enclosure. The cover has an embossed section for making good the deficiency of potting compound. The embossed section is formed by embossing an area of flat surface of the cover so that the embossed section corresponds to sizes and arrangement of the ballast and the varieties of parts.

1 Claim, 3 Drawing Sheets

BALLAST CASE FOR ELECTRONIC FLUORESCENT LAMP

BACKGROUND OF THE INVENTION

1. Field of the Invention

The present invention relates in general to ballast cases for electronic fluorescent lamps and, more particularly, to a structural improvement in such ballast cases for facilitating the potting compound charging work, which potting compound is typically charged in the ballast case with the object of protection of the ballast as well as of prevention of noise.

2. Description of the Prior Art

As well known to those skilled in the art, a typical ballast case for electronic fluorescent lamp comprises a ballast enclosure and a cover. The ballast enclosure of the ballast case supports the ballast and varieties of parts therein and is charged with potting compound for protection of both the ballast and varieties of parts. The ballast enclosure charged with the potting compound is assembled with the cover, thus to form the ballast case.

With reference to FIGS. 1 and 2, there is shown a typical ballast case designated by the numeral 10. The ballast enclosure 12 of the ballast case 10 has a rectangular box shape, while the cover 14 covering the ballast enclosure 12 is a rectangular plate.

That is, the ballast enclosure 12 of the ballast case 10 is installed with the ballast (S) itself and varieties of parts (P) therein as best seen in FIG. 2. The ballast enclosure 12 installed with the ballast (S) and varieties of parts (P) is, thereafter, charged with the potting compound (C) for protecting both the ballast (S) and varieties of parts (P). The ballast enclosure 12 in turn is covered with the cover 14, thus to form the ballast case 10.

With the potting compound (C) charged in the ballast enclosure 12 installed with the ballast (S) and varieties of parts (P), the ballast (S) and varieties of parts (P) are effectively protected. Furthermore, the potting compound (C) prevents the noise generated from both the ballast (S) and varieties of parts (P). When the ballast enclosure 12 is charged with deficient amount of potting compound (C), there will be formed a cavity in the ballast enclosure 12 and such a cavity causes a problem that prevention of noise as well as protection of parts can not be achieved. Therefore, charging of potting compound (C) in the ballast enclosure 12 should be carried out with prudence. In order to achieve the desired protection of both the ballast (S) and varieties of parts (P) along with the desired prevention of operational noise of the ballast, the potting compound (C) should be charged in the ballast enclosure 12 so that a potting compound layer is formed between the top surface of the ballast (S) and the bottom surface 14*a* of the cover 14. In order to achieve the above object, a sufficient amount of potting compound (C) should be charged in the ballast enclosure 12 so that the potting compound (C) completely covers the top surface of the ballast (S) and hides the ballast (S). In this case, the potting compound (C) not only prevents noise generation by absorbing the vibration caused by overvoltage of the ballast (S) but also protects the ballast (S) and the parts (P).

However, a potting compound charging worker who is anxious about overflow of the sticky potting compound (C) out of the ballast enclosure 12 often charges deficient amount of potting compound (C) in the ballast enclosure 12 during manufacture of the ballast cases 10. When deficient amount of potting compound (C) is charged in the ballast enclosure 12 so that the potting compound Can not cover the top surface of the ballast (S), there is formed a cavity 16 between the top surface of the ballast (S) and the bottom surface 14*a* of the cover 14 as shown in FIG. 2. The cavity 16 causes the overvoltage of the ballast (S) to be sent through the cavity 16, thus to generate severe noise.

SUMMARY OF THE INVENTION

It is, therefore, an object of the present invention to provide a ballast case for electronic fluorescent lamp in which the above problems: can be overcome and whose cover is provided with an embossed section making good a deficiency of potting compound even when deficient amount of potting compound is charged in the ballast enclosure, thus to facilitate the potting compound charging work and to effectively prevent generation of noise caused by overvoltage of ballast.

In order to accomplish the above object, the present invention provides a ballast case for electronic fluorescent lamp comprising a rectangular box type ballast enclosure charged with potting compound and having a ballast and varieties of parts therein, and a rectangular plate type cover covering the ballast enclosure, wherein the cover has an embossed section for making good a deficiency of potting compound, which embossed section is formed by embossing an area of flat surface of the cover so that the embossed section corresponds to sizes and arrangement of the ballast and the varieties of parts.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
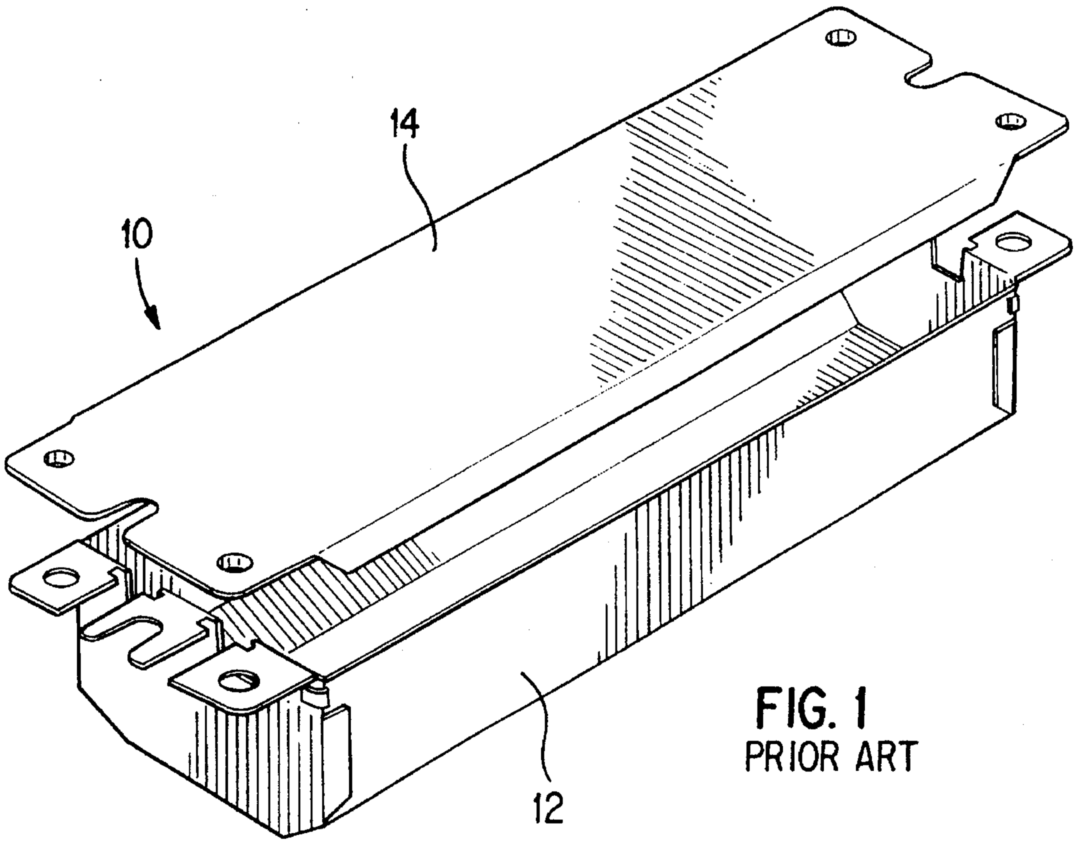
FIG. 1 PRIOR ART
FIG. 1 is an exploded perspective view of a typical ballast cave for electronic fluorescent lamp.
Figure 2:
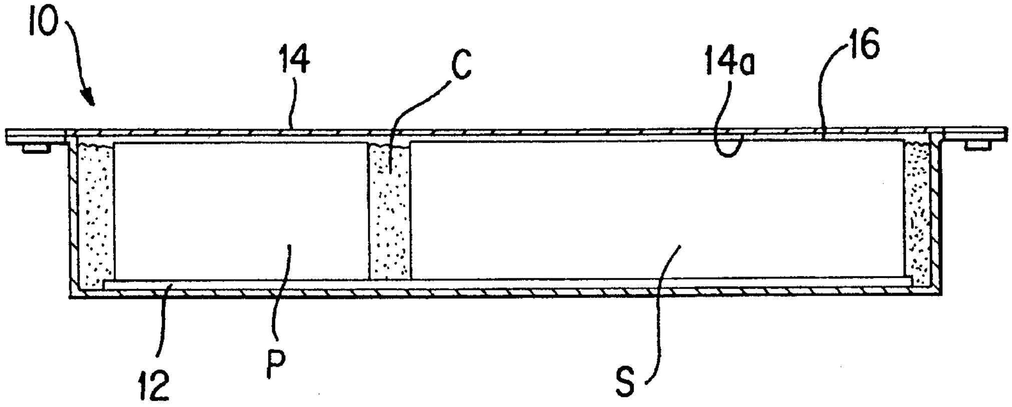
FIG. 2 PRIOR ART
FIG. 2 is a sectional view of the typical ballast case having a ballast itself and varieties of parts therein.

In the following description, the elements common to both the embodiments of the present invention and the above-described prior embodiment will carry the same reference numerals.

Figure 3:
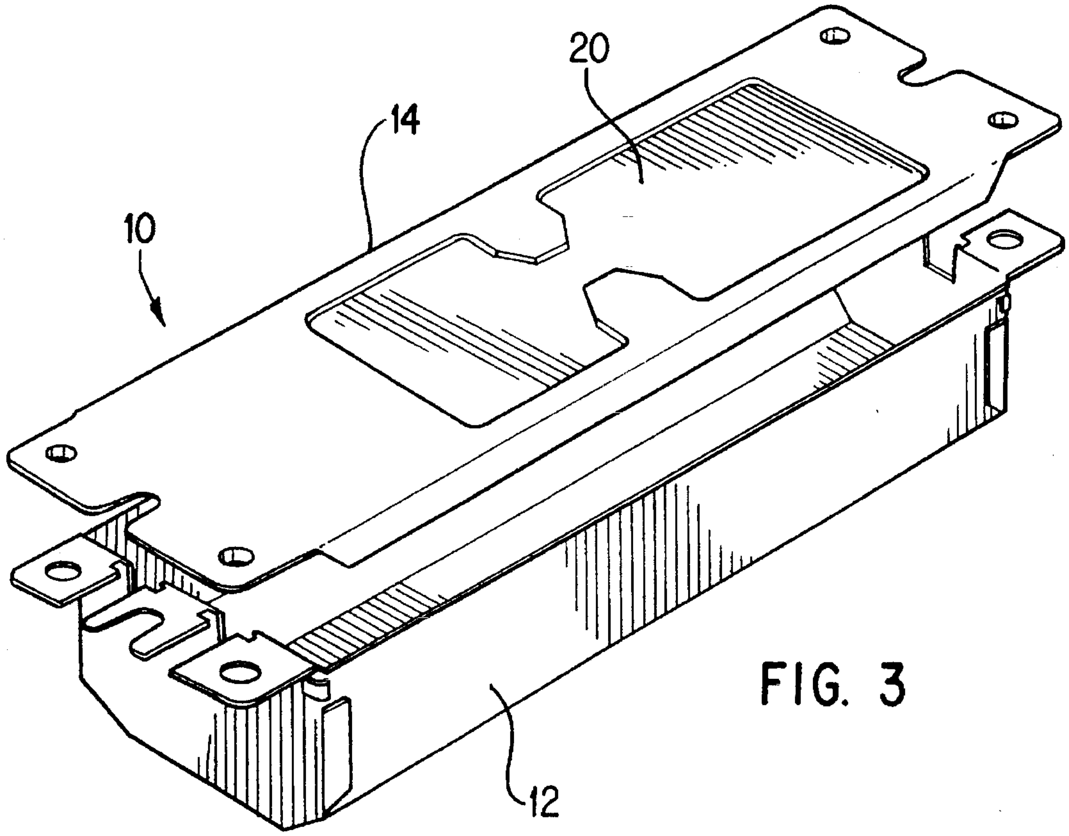
FIG. 3 is an exploded perspective view of a ballast case for electronic fluorescent lamp in accordance with an embodiment of the present invention.
Figure 4:
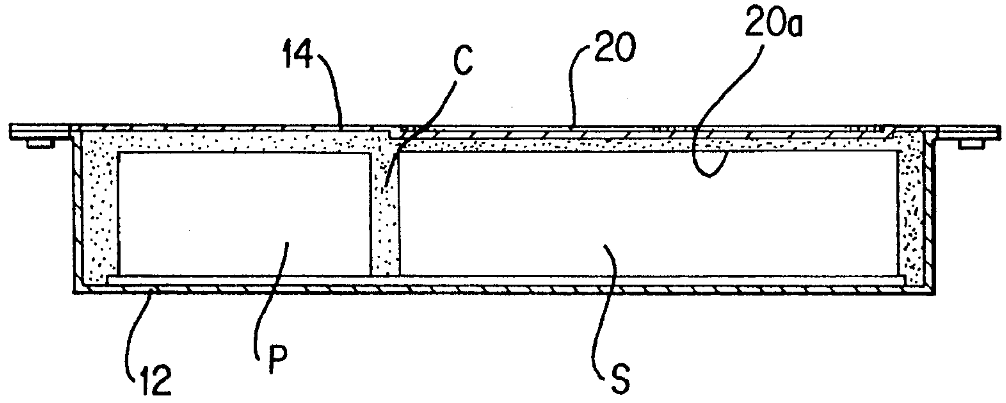
FIG. 4 is a sectional view of the ballast case of FIG. 3, showing a ballast itself and varieties of parts placed in the case.

Referring first to FIGS. 3 and 4, there is shown a ballast case 10 in accordance with a primary embodiment of the present invention. The ballast case 10 includes a ballast enclosure 12 which has a rectangular box shape and supports a ballast (S) and varieties of parts (P) therein. A rectangular plate of cover 14 covers the ballast enclosure 12. A predetermined area of flat surface of the cover 14 is embossed, thus to form an embossed section 20. The embossed section 20 of the cover 14 makes good a deficiency of potting compound (C) even when deficient amount of potting compound (C) is charged in the ballast enclosure 12.

That is, the embossed section 20 of the cover 14 makes good the deficiency of potting compound (C) even when a potting compound charging worker, who is anxious about overflow of the sticky potting compound (C) out of the ballast enclosure 12, merely charges deficient amount of potting compound (C) in the ballast enclosure 12 during manufacture of the ballast cases 10. If described in detail, when the cover 14 provided with the embossed section 20 is assembled with the ballast enclosure 12 charged with an appropriate amount of potting compound (C), the embossed section 20 presses down the potting compound (C) in the enclosure 12 so that a potting compound layer is formed between the top surface of the ballast (S) and the bottom surface 20*a* of the embossed section 20. The potting compound layer formed between the top surface of the ballast (S) and the bottom surface 20*a* of the embossed section 20 prevents the overvoltage of ballast (S) from sending through between the ballast (S) and the cover 14, thus to prevent generation of noise caused by the overvoltage. In this regard, the potting compound charging work for the ballast case 10 of this invention will be achieved more rapidly and more precisely, thus to improve the productivity as well as quality of products.

Figure 5:
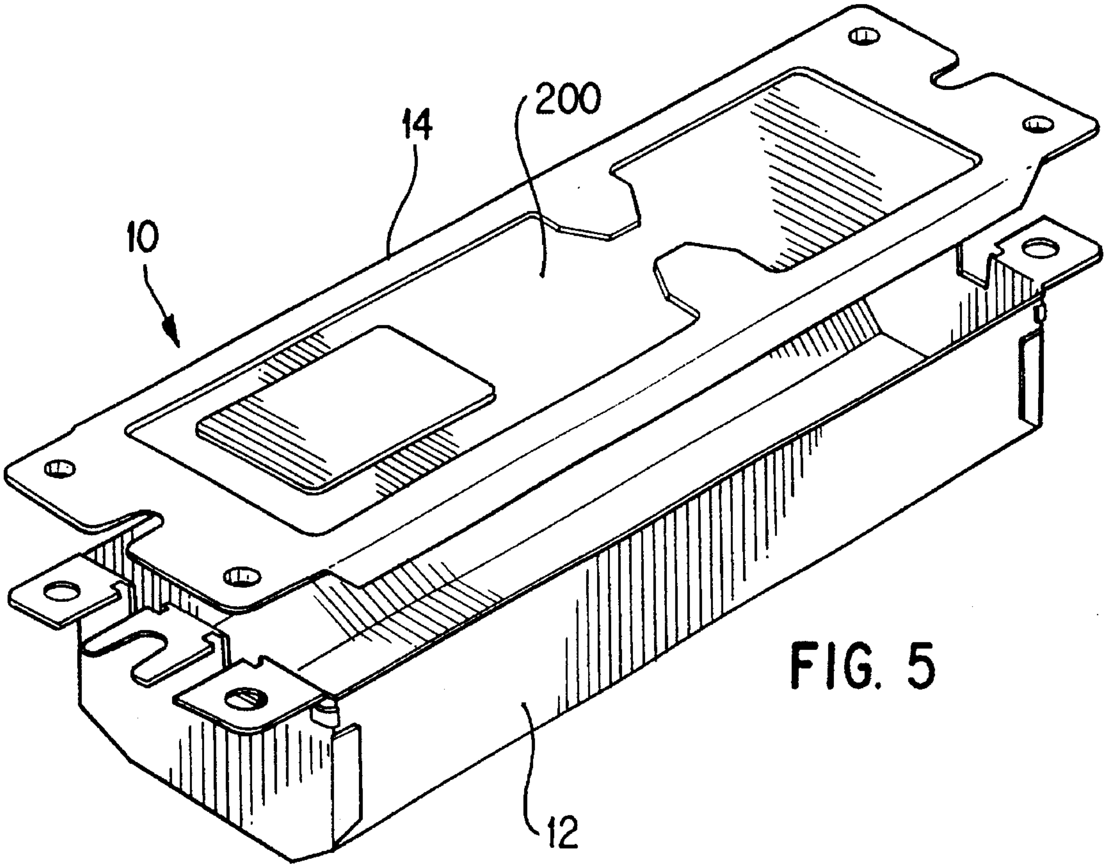
FIG. 5 is an exploded perspective view of a ballast case for electronic fluorescent lamp in accordance with another embodiment of the present invention.
Figure 6:
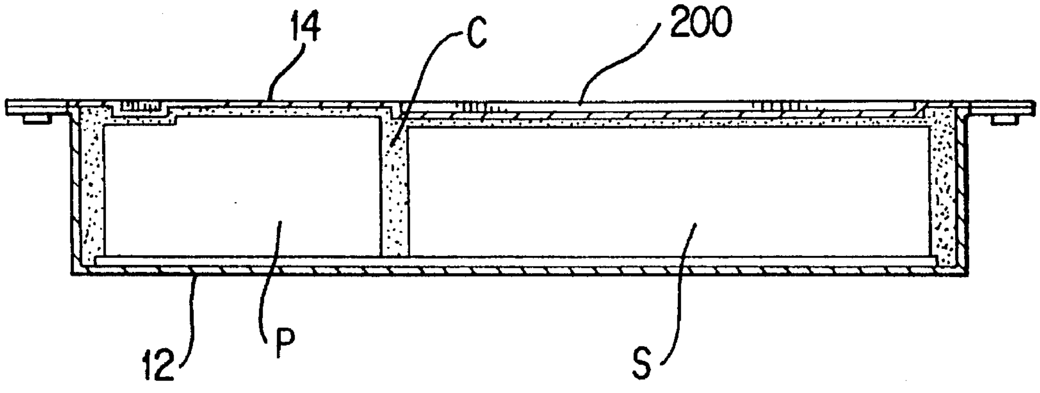
FIG. 6 is a sectional view of the ballast case of FIG. 5, showing the ballast itself and varieties of parts placed in the case.

Turning to FIGS. 5 and 6, there is shown a ballast case 10 in accordance with a second embodiment of the present invention. In the ballast case 10 of the second embodiment, the configuration of embossed section 200 of the cover 14 is altered to correspond to sizes and arrangement of the ballast (S) and the parts (P) placed in the enclosure 12. As represented in the second embodiment, there may exist a variety of different configurations of embossed section of the cover in order for corresponding to varieties of ballasts and varieties of parts.

As described above, the cover of the ballast case according to the present invention is provided with an embossed section making good a deficiency of potting compound even when deficient amount of potting compound is charged in the ballast enclosure. With the embossed section of the cover, the potting compound charging work for the ballast case of this invention will be achieved more rapidly and more precisely, thus to improve the productivity as well as quality of products. The ballast case of this invention not only reliably prevents generation of noise caused by overvoltage of ballast but also protects the ballast as well as the parts, even when deficient amount of potting compound is charged in the ballast enclosure.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. In a ballast case for electronic fluorescent lamp comprising a rectangular box type ballast enclosure charged with potting compound and having a ballast and varieties of parts therein, and a rectangular plate type cover covering the ballast enclosure, wherein the improvement comprises:

said cover having an inwardly embossed section for overcoming a deficiency of potting compound, said embossed section being formed by embossing an area of flat surface of the cover so that said embossed section corresponds to interior sizes and arrangement of the ballast and the varieties of parts, thereby reliably preventing noise generation caused by overvoltage of the ballast and protecting the ballast as well as parts even when a deficient amount of potting compound is charged in the ballast case.

* * * * *